Figure 3:
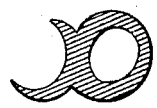

Aug. 20, 1929. A. DONALDSON 1,725,571
METHOD OF MAKING PICTURES AND DESIGNS
Filed June 23, 1928
Fig. 1
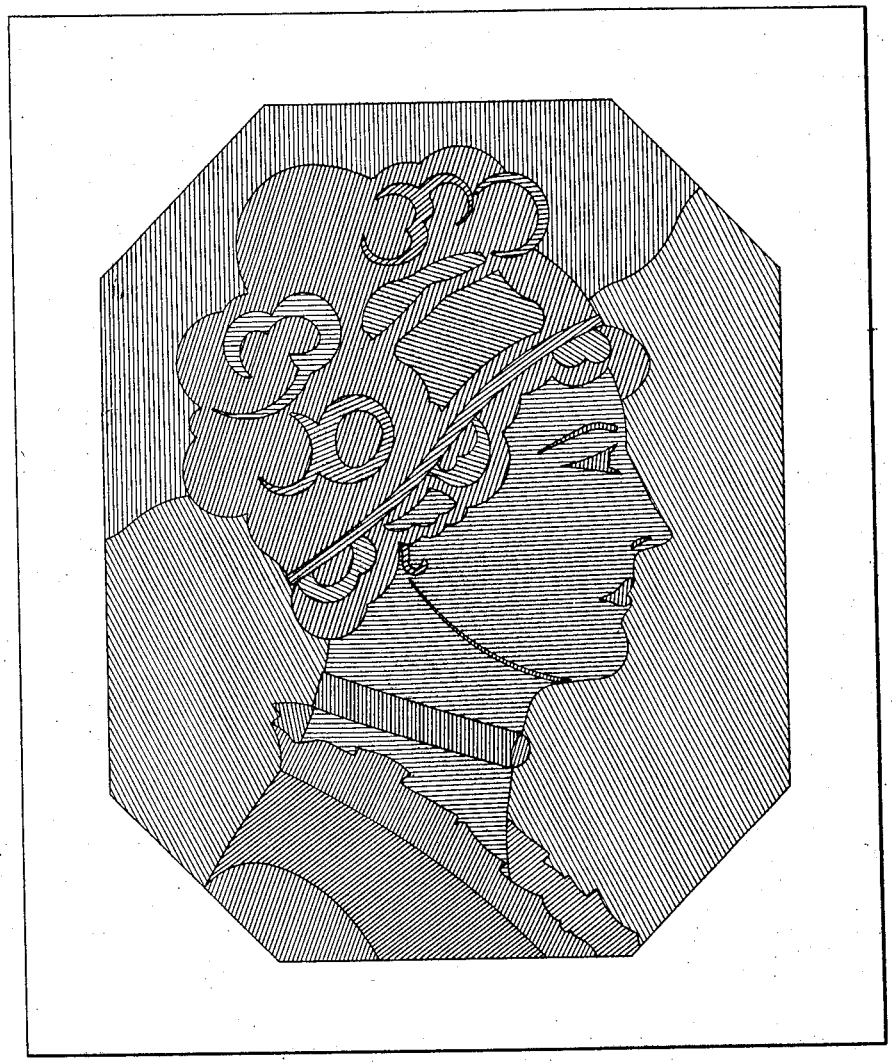
Fig. 2

Fig. 4
INVENTOR.
Alice Donaldson
BY Everett N. Curtis
ATTORNEY Patented Aug. 20, 1929.

1,725,571

UNITED STATES PATENT OFFICE.

ALICE DONALDSON, OF NEW YORK, N. Y.

METHOD OF MAKING PICTURES AND DESIGNS.

Application filed June 23, 1928. Serial No. 287,699.

My invention relates to methods of making pictures and designs; and its objects are to utilize the different reflective values of a single sheet, to produce a contrast of such reflective values when placed in juxtaposition, to effectively combine contrasting sections of said sheet as an artistic whole, to dispense with the use of paints or pigments, and to bring about new and pleasing effects.

To make a picture or design in accordance with my invention, I preferably employ a lustrous gold or silver paper homogeneous in texture and having a number of different reflective values, each of which is constant when viewed from one single view point. Thus, for example, such paper placed upon the flat surface of a table and viewed in a forward direction will present one appearance; when viewed from the side another appearance, and when viewed diagonally or in another direction, still another appearance. In fact, there may be a few or many of these reflective appearances, depending upon the particular character of the sheet employed. To form the picture or design, I cut out portions of the sheet, and by turning such portions laterally, I am able to bring the same together in such a manner as to effectuate contrasting surfaces and outlines resulting in the picture.

In the accompanying drawing, in which Figure 1 illustrates a picture made in accordance with my invention, and Figs. 2, 3 and 4, parts thereof, the attempt has been made in a preferred form of my invention to indicate as nearly as possible and to distinguish each of the particular reflective values as actually combined into a picture. This has been accomplished by the use of parallel lines, but it is to be understood that such lines are not present or actually employed in my invention, and, as used here, only serve to indicate one particular reflective value in contrast with other reflective values of the same sheet. Thus in the drawing, the vertical parallel lines serve to indicate a part of the sheet in its normal position. Relative to such part all the other parts of the picture are turned so as to occupy positions of different reflective value, the angularities of such turnings being indicated by the parallel lines. In Figs. 2 and 4, are shown the small cuttings employed by me for the eye and mouth, respectively, for the head shown in Fig. 1, and in Fig. 3 is shown a small ornamental cutting for the hat thereof. The effect of turning these cuttings into the positions shown is to bring out and delineate and portray the pictorial contours, and to produce an artistic effect never before accomplished. Through the use of lustrous materials of high reflective values, I am enabled to bring about a highly brilliant and ornamental appearance, particularly when the pictures or design is exposed in a strong light. Thus I have found my invention of especial advantage when used in the making of screens, and for mural decoration, where bizarre or oriental effects are desired.

I am aware that prior to my invention, pictures or designs have been made by pasting upon a background cuttings from different colored paper sheets, but so far as I am aware I am the first to employ cuttings from a single homogeneous sheet to form a picture or ornamental surface utilizing for such purpose the differing reflective values of such sheet. I, therefore, desire to be understood in the claims to cover such invention in the broadest possible manner.

What I claim and desire to secure by Letters Patent is:—

1. A method of making pictures and designs, consisting in forming contours from a sheet having different reflective values, and then combining such contours so as to contrast said reflective values and thereby form a picture.

2. A method of making pictures and designs, consisting in cutting contours from a sheet having a plurality of reflective values, each of such values being constant when viewed from one direction, and then combining such contours so as to contrast said values and thereby form a picture.

3. A method of making pictures and designs, consisting in cutting out parts of a lustrous sheet presenting contrasting effects when viewed from different directions, and then assembling such parts so as to bring contrasting surfaces into juxtaposition and thereby form a picture.

In testimony whereof I have hereunto set my hand this 22d day of June, 1928.

ALICE DONALDSON.